(12) United States Patent
Zhou et al.

(10) Patent No.: US 10,281,209 B2
(45) Date of Patent: May 7, 2019

(54) HEAT EXCHANGERS FOR LOW TEMPERATURE CARBON DIOXIDE SEPARATION FROM NATURAL GAS

(71) Applicant: UOP LLC, Des Plaines, IL (US)

(72) Inventors: Lubo Zhou, Inverness, IL (US);
Thomas J. Godry, Kenmore, NY (US);
Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/846,898

(22) Filed: Dec. 19, 2017

(65) Prior Publication Data

US 2018/0106535 A1  Apr. 19, 2018

Related U.S. Application Data

(63) Continuation of application No. PCT/US2016/037971, filed on Jun. 17, 2016.
(Continued)

(51) Int. Cl.
*F28F 13/18* (2006.01)
*F28F 19/02* (2006.01)
(Continued)

(52) U.S. Cl.
CPC ............ *F25J 5/00* (2013.01);
*B01D 1/02* (2013.01); *B01D 1/04* (2013.01);
*B01D 3/322* (2013.01); *B01D 53/00* (2013.01); *F25J 3/0209* (2013.01); *F25J 3/0233* (2013.01); *F25J 3/0266* (2013.01);
*F25J 5/005* (2013.01); *F28D 7/06* (2013.01); *F28F 13/10* (2013.01); *F28F 13/187* (2013.01);
(Continued)

(58) Field of Classification Search
CPC ...... B01D 53/002; B01D 53/501; B01D 1/02; B01D 1/04; B01D 3/322; B01D 53/00; F25J 5/00; F25J 3/0209; F25J 3/0233; F25J 3/0266; F25J 15/05; F28D 7/06; F28F 13/10; F28F 13/187; F28F 21/082
USPC ....................................................... 165/133
See application file for complete search history.

(56) References Cited

U.S. PATENT DOCUMENTS 3,948,294 A * 4/1976 Magarian ................ F16L 57/00
138/141
5,384,106 A * 1/1995 Johnson ............... B01D 53/501
422/169
(Continued)

FOREIGN PATENT DOCUMENTS

WO     2014078092 A1    5/2014

OTHER PUBLICATIONS

Wolf, "High-flux tubing conserves energy", Chem Eng Prog V72 N.7 53-55 (Jul. 1976), v 72, n 7, p. 53-55, Jul. 1976; ISSN: 03607275; Publisher: American Institute of Chemical Engineers (AIChE).
(Continued)

*Primary Examiner* — Davis D Hwu (57) ABSTRACT

A reboiler in fluid communication with a fractionator column in an offshore low temperature process removing carbon dioxide from natural gas has a vessel volume. A carbon steel tubing bundle is disposed within the vessel volume. Each tube in the bundle has an outer surface with a porous granular metal layer deposited thereon. The granular metal layer comprises a pore size distribution which promotes bubble nucleation during vaporization of a nearly pure liquid carbon dioxide stream.

18 Claims, 5 Drawing Sheets

Related U.S. Application Data (60) Provisional application No. 62/186,945, filed on Jun. 30, 2015.

(51) Int. Cl.

| | | |
|---|---|---|
| *F25J 5/00* | (2006.01) |
| *B01D 53/00* | (2006.01) |
| *F28F 13/10* | (2006.01) |
| *B01D 3/32* | (2006.01) |
| *F28F 21/08* | (2006.01) |
| *F28D 7/06* | (2006.01) |
| *B01D 1/02* | (2006.01) |
| *B01D 1/04* | (2006.01) |
| *F25J 3/02* | (2006.01) |
| *F28F 1/40* | (2006.01) |
| *F28F 1/42* | (2006.01) |
| *F28F 1/12* | (2006.01) |
| *F28D 21/00* | (2006.01) |
| *F28F 9/22* | (2006.01) |
| *F28D 1/02* | (2006.01) |
| *C10L 3/10* | (2006.01) |

(52) U.S. Cl.
CPC ......... *F28F 21/082* (2013.01); *B01D 53/002* (2013.01); *B01D 2256/22* (2013.01); *B01D 2256/245* (2013.01); *C10L 3/104* (2013.01); *C10L 2290/541* (2013.01); *F25J 2200/02* (2013.01); *F25J 2200/50* (2013.01); *F25J 2200/72* (2013.01); *F25J 2250/02* (2013.01); *F25J 2290/44* (2013.01); *F25J 2290/72* (2013.01); *F28D 1/0213* (2013.01); *F28D 2021/0064* (2013.01); *F28F 1/12* (2013.01); *F28F 1/40* (2013.01); *F28F 1/42* (2013.01); *F28F 2009/226* (2013.01); *Y02C 10/12* (2013.01); *Y02P 70/34* (2015.11)

(56) References Cited

U.S. PATENT DOCUMENTS

| | | | |
|---|---|---|---|
| 7,955,420 B2 * | 6/2011 | Stinson | B01D 53/002 |
| | | | 166/268 |
| 8,025,720 B2 | 9/2011 | Barclay et al. | |
| 8,381,544 B2 | 2/2013 | Coyle | |
| 2014/0165650 A1 | 6/2014 | Jibb et al. | |

OTHER PUBLICATIONS

Milton, "High efficiency reboilers and condensers", Chemical Engineering Progress (1972), 68(9), 56-61.

Ragi, "Retrofit refinery feed-effluent heaters for capacity increase and energy savings", American Society of Mechanical Engineers, Heat Transfer Division, (Publication) HTD, v 85, p. 51-56, 1987; ISSN: 02725673; Conference: Boiling and Condensation in Heat Transfer Equipment.

Gottzmann, "High efficiency heat exchangers", Chemical Engineering Progress, v 69, n 7, p. 69-75, Jul 1973; ISSN: 03607275.

Search Report dated Sep. 29, 2016 for corresponding PCT Appl. No. PCT/US2016/037971.

* cited by examiner

HEAT EXCHANGERS FOR LOW TEMPERATURE CARBON DIOXIDE SEPARATION FROM NATURAL GAS

CROSS-REFERENCE TO RELATED APPLICATIONS

This application is a Continuation of copending International Application No. PCT/US2016/037971 filed Jun. 17, 2016 which application claims benefit of U.S. Provisional Application No. 62/186,945 filed Jun. 30, 2015, the contents of which cited applications are hereby incorporated by reference in their entirety.

FIELD OF THE INVENTION

This invention relates generally to heat exchangers used in a process for removing carbon dioxide from natural gas, and more particularly to a reboiler in an offshore low temperature distillation processes for removing carbon dioxide from natural gas.

BACKGROUND OF THE INVENTION

Carbon dioxide removal from natural gas to meet specifications can in principle be achieved through the use of different sweetening technologies. Examples of applicable technology options for carbon dioxide removal are chemical and physical absorption, membrane separation, pressure-swing adsorption (PSA), and cryogenic/low-temperature distillation.

In a known low-temperature distillation process, methane is withdrawn from the top of a distillation column and carbon dioxide and heavy hydrocarbons are withdrawn from the bottom. Heat exchangers are used in the distillation process to cool the feed stream from gas to liquid phase or reboil liquid in the column to generate vapor phase for mass transfer between the phases based on difference in volatilities.

Recently, it has been proposed that a cryogenic/low temperature distillation system can be used to remove carbon dioxide from offshore natural gas fields. These gas fields may contain as little as 30% hydrocarbons and 70% carbon dioxide. The offshore system will have to reduce the carbon dioxide level dramatically to produce a usable product. Such offshore processing systems face significant difficulties due to the offshore environment.

For example, the overall weight and footprint of such systems are of a significant concern in offshore operations. Designers endeavor to identify ways that the overall weight and surface area can be reduced without adversely affecting the efficiency of the system. Furthermore, it is desirable to maintain a system height that is as low as possible.

Therefore, there is a need for effective and efficient systems for offshore processing of high carbon dioxide natural gas.

SUMMARY OF THE INVENTION

A first aspect of the present invention is directed to a heat exchanger used in an offshore low temperature system which removes carbon dioxide from natural gas. In this aspect of the invention the heat exchanger is a reboiler in fluid communication with a fractionator column. The reboiler comprises a rigid vessel having an outer shell defining a vessel volume. The rigid vessel has an inlet in fluid communication with the fractionator for receiving a liquid stream therefrom and an outlet for returning a vapor to the fractionator. A carbon steel tubing bundle is horizontally disposed within the vessel volume. Each tube in the carbon steel tubing bundle has an outer surface and an inner surface. The outer surface has a porous granular metal layer deposited thereon. The inner surface is generally smooth relative to the layer on the outer surface. The granular metal layer comprises a pore size distribution adapted to promote and increase a bubble nucleation during vaporization of a nearly pure liquid carbon dioxide stream.

This aspect of the invention may include one or more of the following features, alone or in any reasonable combination. The granular metal layer may be metallurgically bonded to each tube in the carbon steel tubing bundle. The shell may be produced from a carbon steel. A weight of the reboiler may be less than 27,000 kg. A weight of the reboiler may be less than 22,000 kg. The outer surface having the granular metal layer deposited thereon may increase an overall heat transfer coefficient (U-value) of each tube in the carbon steel tubing bundle at least 1.3 times that of a bare outer surface of a tube in an otherwise identical carbon steel tubing bundle. The inner surface may have a plurality of fins radiating inwardly therefrom. The nearly pure liquid carbon dioxide stream within the reboiler may have a purity of greater than 90 mol %. The nearly pure liquid carbon dioxide stream within the reboiler may have a purity greater than 95 mol %, or about 97 mol %. A temperature of a bottoms stream entering the reboiler may be between 10.4° C. and 10.8° C. A bottoms stream inlet operating pressure may be about 46.5 bar-g. A tube-side stream temperature within the carbon steel tubing bundle may be between 20.9° C. to 32.5° C. A tube-side stream temperature within the carbon steel tubing bundle may be between 15.5° C. to 25.0° C. An outside tube diameter in the carbon steel tubing bundle may be less than 5.0 cm. An outside tube diameter in the carbon steel tubing bundle may be less than or equal to 2.5 cm.

In a second aspect of the invention, a reboiler in fluid communication with a fractionator column in an offshore low temperature system removing carbon dioxide from natural gas comprises a rigid vessel having a carbon steel outer shell defining a vessel volume. The rigid vessel has an inlet in fluid communication with the fractionator for receiving a liquid steam therefrom and an outlet for returning a vapor to the fractionator. A carbon steel tubing bundle is horizontally disposed within the vessel volume. Each tube in the carbon steel bundle has an outer surface and an inner surface. The outer surface has a porous granular metal layer deposited thereon. The inner surface may be generally smooth relative to the porous granular metal layer or have a plurality of fins extending radially inwardly relative thereto. The granular metal layer comprises a pore size distribution adapted to promote and increase bubble nucleation during vaporization of liquid on the outer surface of the tubes. A liquid carbon dioxide stream is within the rigid vessel. The stream has a purity greater than 90 mol %. A weight of the reboiler may be less than 22,000 kg, and the outer surface with the granular metal layer deposited thereon increases an overall heat transfer coefficient (U-value) of each tube in the carbon steel tubing bundle at least 1.3 times a bare outer surface of a tube in an otherwise identical carbon steel tubing bundle.

DETAILED DESCRIPTION OF THE DRAWINGS

One or more exemplary embodiments of the present invention will be described below in conjunction with the following drawing figures, in which.

DETAILED DESCRIPTION OF THE INVENTION

The present invention is generally directed to heat exchangers used in the separation of carbon dioxide from natural gas. More specifically, the present invention reduces the weight, footprint and height of reboilers provided in an offshore system for removing carbon dioxide from natural gas. A reboiler is in fluid communication with a fractionator column in an offshore low temperature system for removing carbon dioxide from natural gas.

With these general principles in mind, one or more embodiments of the present invention will be described with the understanding that the following description is not intended to be limiting.

Figure 1:
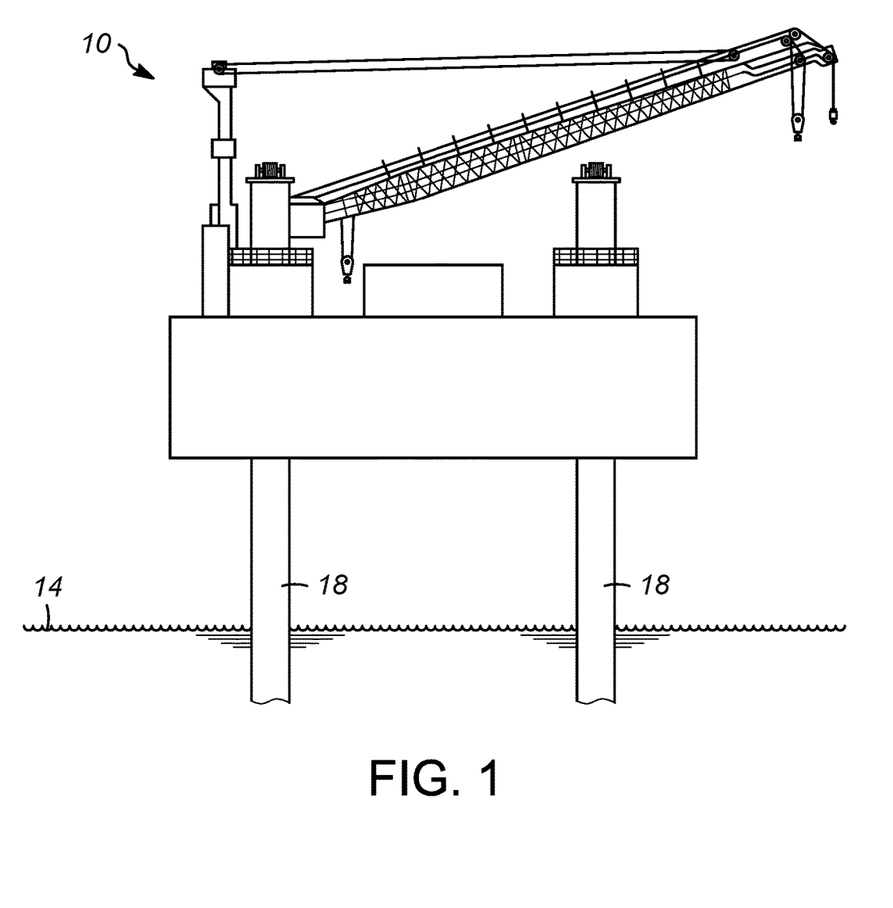
FIG. 1 is a representation of an offshore platform.

Referring to FIG. 1, a typical offshore platform 10 for extracting and processing natural gas is illustrated. The platform 10 is supported above a water line 14 by one or more columns 18. The columns 18 extend downwardly below the water line 14 to the sea floor. The platform 10 physically supports a system for extracting natural gas from below the sea floor. A typical system for extracting high carbon dioxide natural gas in an offshore facility may include one or more such platforms 10, each having one or more subsystems of the overall system. Alternatively, an offshore system may float above the water line 14. Here, offshore process may be either a stationary platform 10 as shown or a floating system.

Figure 2:
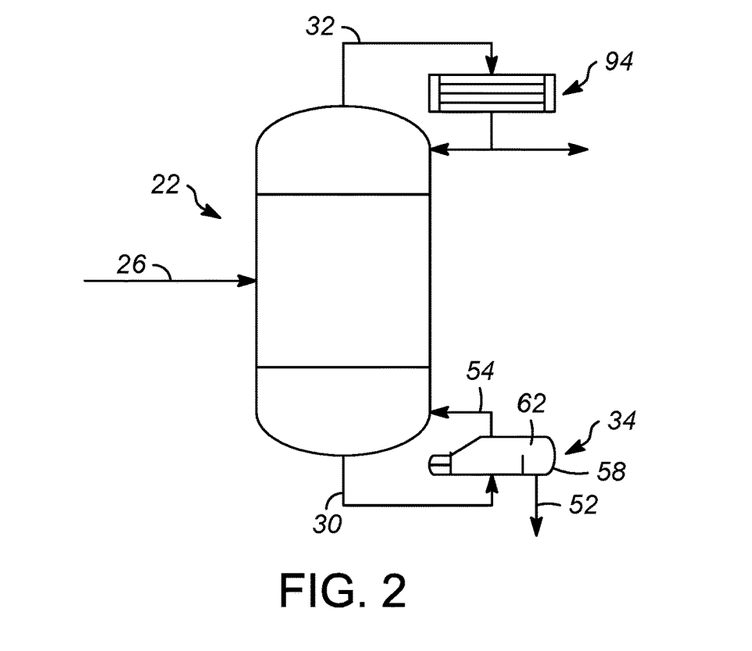
FIG. 2 is a simple schematic of a low temperature distillation process for removing carbon dioxide from natural gas.

Referring to FIG. 2, one such subsystem is a fractionator column 22, or simply a fractionator. The purpose of the fractionator 22 is to process a gas mixture extracted from below the sea floor and separate the various components. The components are then stored, transported, or otherwise disposed.

One type of fractionator 22 uses refrigeration at low temperatures ranging from below −20° C. to above 0° C., more preferably −30° C. to above 10° C. At these temperatures, the feed gas mixture can be separated by distillation into a gas stream at the top of fractionators 22 containing mostly methane and carbon dioxide and a liquid stream at the bottom containing mostly carbon dioxide and heavier hydrocarbons. In most cases, the distillation column 22 is operated at a continuous steady state. A feed 26 is always being added to the column 22 and a bottoms stream 30 is always being removed. In this case, the bottoms stream 30 is nearly pure carbon dioxide. Here, the term "nearly pure" indicates a percentage greater than or equal to 90 mol % carbon dioxide. The bottoms stream 30 may be greater than or equal to 95 mol % carbon dioxide. A predominantly methane product 32 is withdrawn from the top of the fractionator 22.

Figure 3:
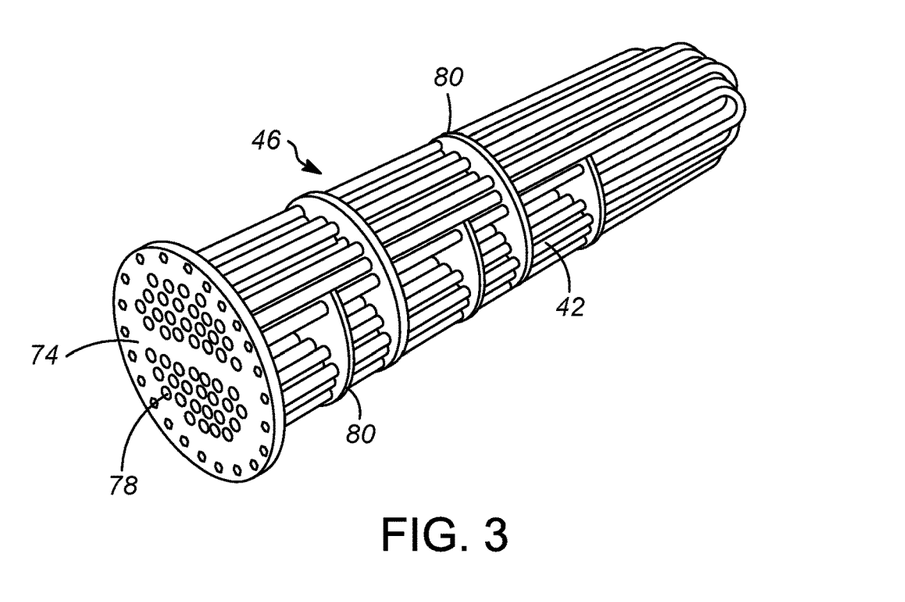
FIG. 3 is a perspective view of a tube bundle provided in a reboiler.
Figure 4:
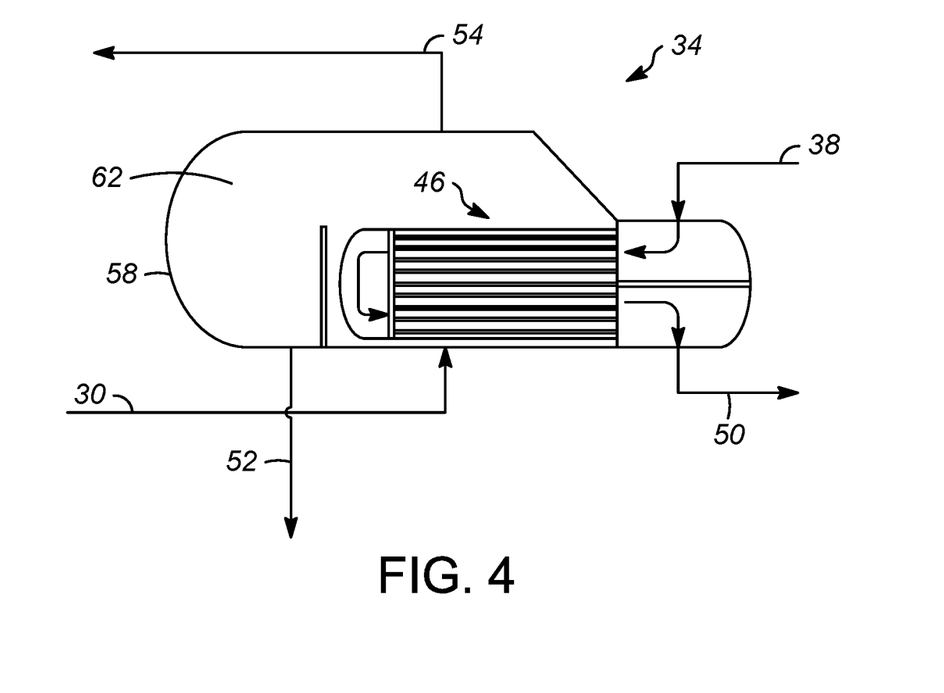
FIG. 4 is schematic of a reboiler used in the process of FIG. 2.

One or more heat exchangers are typically used in conjunction with low temperature fractionators 22. One such heat exchanger is a reboiler 34. At least one reboiler 34 is in fluid communication with the fractionator 22. Feed gas 38, as shown in FIG. 4, with temperatures significantly higher than that of the liquid at the bottom of the fractionator, can be used to heat the liquid in the reboiler 34. The feed gas 38 flows through a plurality of tubes 42 arranged in a bundle 46 as shown in FIG. 3 and the cooled gas stream 50 is then removed from the bundle 46 and sent to other heat exchangers or expanders for further cooling before feeding into the fractionator 22. These reboilers 34 are generally very large and can have weights that exceed 18.200 kg (40,000 lbs) and 27,000 kg (59,400 lbs).

The reboiler 34 receives a liquid stream 30 from the fractionator 22 and heats the liquid stream 30 by passing it over the tubes 42 in the bundle 46 as shown in FIG. 3. A liquid product 52 is removed from the reboiler 34 for further processing. A vapor stream 54 is also removed from the reboiler 34 and returned to the fractionator 22. The reboiler 34 generally operates under the parameters set forth in Table 1.

TABLE 1

| Parameter | In | Out |
| --- | --- | --- |
| Tube Side Temperature, ° C. | 32.5 | 20.9 |
| Shell Side Operating Pressure, bar | 47.5 | 47.5 |
| Shell Side Temperature ° C. | 10.4 | 10.8 |

The reboiler 34 includes a rigid vessel 58 having an outer shell of carbon steel defining a vessel volume 62. The vessel 58 as an inlet through which a nearly pure stream of liquid carbon dioxide 30 is received. An outlet is provided to deliver the vapor stream 54 from the vessel 58. An additional outlet is provided to deliver the cooled gas stream 50 from the reboiler 34 as shown in FIG. 4.

Figure 5:
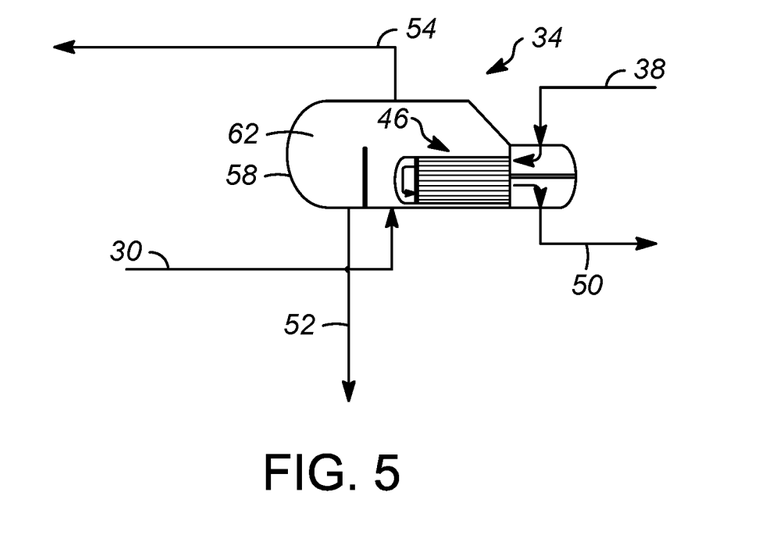
FIG. 5 is a schematic of a reboiler used in the process of FIG. 2 with approximately a 50% reduction in overall size in accordance with the present invention.

As illustrated in FIG. 3, the tubes 42 are arranged in the bundle 46. The bundle 46 is horizontally disposed within the vessel volume 62 as shown in FIGS. 4 and 5. The tubes 42 may be linearly aligned or form a curvilinear, generally U-shaped, structure as illustrated.

As shown, the bundle 46 has an end plate 74 provided with apertures 78. Each aperture 78 is aligned with an end of a tube 42 wherein the heating gas 38 can be delivered through the tubes 42, and cooled gas can exit the tubes 42 in a similar manner. The tubes 42 pass through a series of supports 80 which maintain orientation of the tubes 42 in the bundle 46. In FIG. 3, the bundle 46 utilizes 24 individual U-shaped tubes 42.

As best shown in FIGS. 4-8, the present invention reduces the overall size of the reboiler 34 by incorporating a tubing having an enhanced boiling layer deposited thereon in the bundle 46. This can reduce the number of tubes 42 in a bundle 46. In the examples illustrated in FIGS. 6-8, the number of tubes 42 has been reduced by 50% from 24 tubes to 12 tubes.

Figure 6:
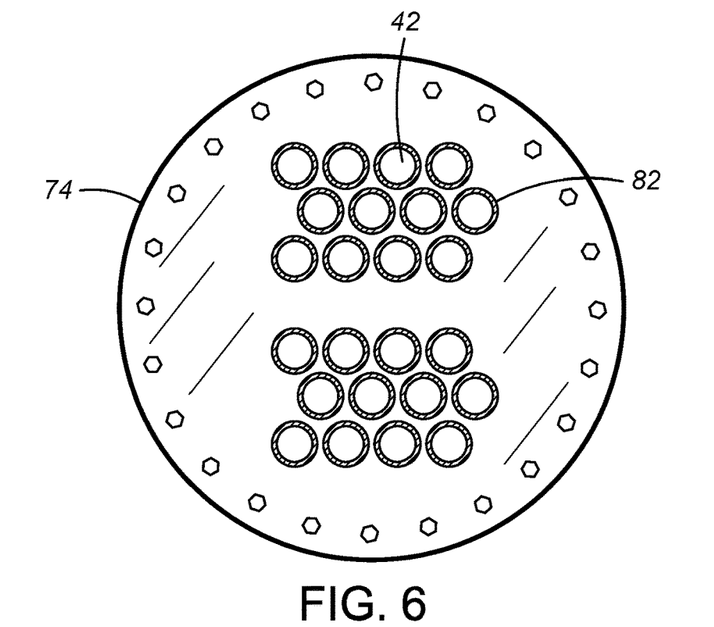
FIG. 6 is a front view of a tube bundle of the present invention as provided in a reboiler.
Figure 7:
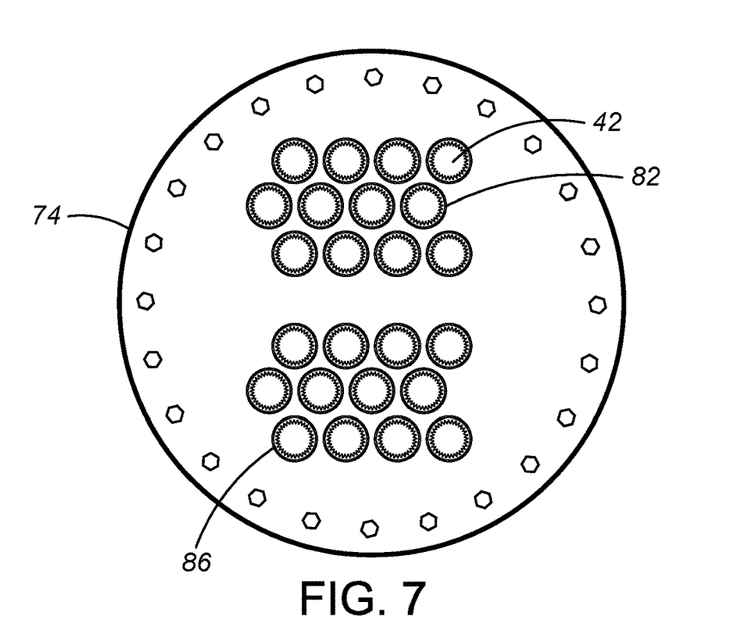
FIG. 7 is a front view of a tube bundle of the present invention as provided in a reboiler.
Figure 8:
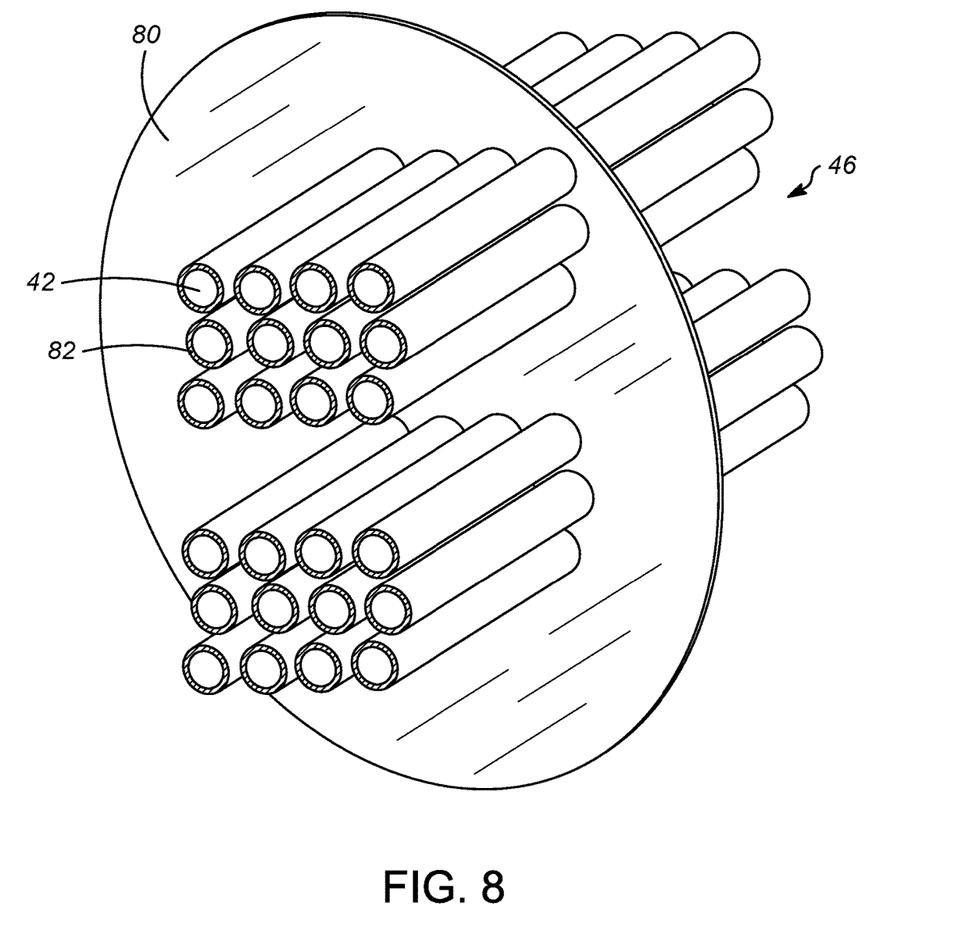
FIG. 8 is a partial perspective view of a tube bundle of the present invention.

The number of tubes 42 can be reduced because such coated tubing enhances heat transfer efficiency in the nucleate boiling process. A thin, granular, porous metal layer 82 or matrix is bonded metallurgically on an outer heat-transfer surface of each tube 42. Saturated liquid is drawn into the layer 82 by capillary action and vaporizes from the extremely large number of pores which exist in the structure.

In the reboiler 34 of the present invention, increased boiling heat transfer coefficients can be achieved vs. those of bare tubes, resulting in an overall heat transfer improvement of 1.3-4 times that of bare tubes. The overall heat transfer coefficient is generally reported as a U-value.

In the reboiler 34 of the present invention, the granular metal layer 82 deposited on the tubes 42 increases the U-value of each tube 42 to be at least 1.3 times that of a bare outer surface of a tube in an otherwise identical carbon steel tubing bundle.

Each tube 42 is produced from a carbon steel. As explained above, outer surfaces of the tubes 42 have a porous, granular metal layer 82 deposited thereon. Inner surfaces of the tubes 42 are generally smooth relative to the layer 82 on the outer surfaces. The granular metal layer 82 forms pores, which promote bubble nucleation during vaporization of the stream. The pores also increase heat transfer area for nucleation during vaporization of the nearly pure liquid carbon dioxide stream 30. A pore size or a distribution of pore sizes is chosen to promote and increase bubble nucleation during boiling on the outer surfaces of the tubes 42. An outside diameter of each tube 42 is preferably less than 5.0 cm, more preferably less than or equal to 2.5 cm.

Referring to FIG. 7, in one embodiment, the inner surface of each tube 42 has fins 86. The fins 86 extend radially inwardly relative to the inner surface of the tube 42 and are typically helically patterned.

It is contemplated that the use of the tubing 42 described herein allows reduced number of tubes, smaller vessel size, and reduced reboiler weight. This is important in offshore systems where space and allowed overall weight on platform are limited, and it is desirable to keep weight as low as possible. A comparison of FIGS. 4 and 5 shows that the reboiler 34 can be reduced in size by 50%. Thus, the weight of the reboiler 34 can be reduced to less than 9,100 kg (about 20,000 lbs.), more preferably 5,500 kg (about 12,000 lbs.). In one example, the weight was decreased from less than 27,000 kg, about 26,500 kg (58,300 lbs.), to less than 22,000 kg (48,400 lbs.), about 21,000 kg (46,200 lbs.).

Example 1

Using the principles of the invention discussed herein, design cases for a $CO_2$ Fractionator Reboiler having a 2-pass, U-tube exchanger geometry were generated to provide a comparison of the benefits of the invention versus a bare tube reboiler design. The design has been optimized to take advantage of an available tube-side pressure drop. These design cases reflect calculated tube-side pressure drop values in the range of 40 kPa-50 kPa (i.e. 5.8 psi-7.3 psi), and the cases are summarized in the following table:

TABLE 2

| | Service $CO_2$ Fractionator Reboiler Tube Type | | |
|---|---|---|---|
| | Bare Tube | Enhanced Coated Tube | Doubly-Enhanced Coated Tube |
| Performance | | | |
| Duty, W | 1,943,000 | 1,943,000 | 1,943,000 |
| LMTD, ° C. | 8.4 | 8.4 | 8.4 |

TABLE 2-continued

| | Service $CO_2$ Fractionator Reboiler Tube Type | | |
|---|---|---|---|
| | Bare Tube | Enhanced Coated Tube | Doubly-Enhanced Coated Tube |
| U-Value, $W/m^2 \cdot °C.$ | 556 | 803 | 980 |
| Effective Area per Shell, $m^2$ | 416 | 288 | 236 |
| Geometry | | | |
| Tube Material | Carbon Steel | Carbon Steel | Carbon Steel |
| Exchanger Type | BKU | BKU | BKU |
| Exchanger Orientation | Horizontal | Horizontal | Horizontal |
| Tube Bundle/Kettle Diameter, mm | 1150/1585 | 1100/1515 | 1100/1515 |
| No. of Shells | 1 | 1 | 1 |
| Tubes per Shell | 728 U-tubes | 870 U-tubes | 652 U-tubes |
| Tube Straight Length, mm | 4877 | 3658 | 3353 |
| Tube Diameter, mm | 19.05 | 15.88 | 19.05 |
| Tube Pitch, mm | 25.4 | 22.23 | 25.4 |
| Estimated Exchanger Weight, kg | 26,500 | 21,500 | 21,000 |
| Estimated Exchanger Footprint, m × m | 1.64 × 8.82 | 1.58 × 7.28 | 1.58 × 6.97 |

According to these results, a suitable option for reducing size/weight for the $CO_2$ fractionator reboiler may be a design utilizing 1.5875 cm OD-coated/ID-bare tubing with an enhanced boiling layer marketed by UOP, LLC under the trademark High Flux™ or 1.905 cm OD-coated/ID-finned High Flux™ tubes as alternatives.

Estimated savings in exchanger weight of 5,000 kg-5,500 kg can be achieved, as well as plot space savings 3.0 $m^2$-3.5 $m^2$ associated with smaller footprint of the High Flux™ tubing design options. Both of these benefits carry a higher premium in this offshore application.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Specific Embodiments

While the following is described in conjunction with specific embodiments, it will be understood that this description is intended to illustrate and not limit the scope of the preceding description and the appended claims.

A first embodiment of the invention is a reboiler in fluid communication with a fractionator column in an offshore low temperature system removing carbon dioxide from natural gas, the bottom reboiler comprising a rigid vessel having an outer shell defining a vessel volume, the rigid vessel having an inlet in fluid communication with a fractionator for receiving a liquid stream therefrom and an outlet for returning a vapor to the fractionator; and a carbon steel tubing bundle disposed within the vessel volume each tube in the carbon steel tubing bundle having an outer surface and an inner surface, the outer surface having a granular metal layer deposited thereon, and the inner surface being generally smooth relative thereto, wherein the granular metal layer comprises a pore size distribution adapted to promote and increase bubble nucleation during vaporization of a nearly pure liquid carbon dioxide stream on the outer surfaces of the tubes. An embodiment of the invention is one, any or all of prior embodiments in this paragraph up through the first embodiment in this paragraph wherein the granular metal layer is metallurgically bonded to each tube in the carbon steel tubing bundle. An embodiment of the invention is one, any or all of prior embodiments in this paragraph up through the first embodiment in this paragraph wherein the shell is produced from a carbon steel. An embodiment of the invention is one, any or all of prior embodiments in this paragraph up through the first embodiment in this paragraph wherein a weight of the reboiler is less than 27,000 kg. An embodiment of the invention is one, any or all of prior embodiments in this paragraph up through the first embodiment in this paragraph wherein a weight of the reboiler is less than 22,000 kg. An embodiment of the invention is one, any or all of prior embodiments in this paragraph up through the first embodiment in this paragraph wherein the outer surface having the granular metal layer deposited thereon increases an overall heat transfer coefficient of each tube in the carbon steel tubing bundle by at least 1.3 times that of a bare outer surface of a tube in an otherwise identical carbon steel tubing bundle. An embodiment of the invention is one, any or all of prior embodiments in this paragraph up through the first embodiment in this paragraph wherein the inner surface has a plurality of fins extending radially inwardly relative thereto. An embodiment of the invention is one, any or all of prior embodiments in this paragraph up through the first embodiment in this paragraph wherein the reboiler is a bottom reboiler which receives a liquid bottoms stream from a fractionator column. An embodiment of the invention is one, any or all of prior embodiments in this paragraph up through the first embodiment in this paragraph wherein the carbon steel tubing bundle is horizontally disposed within the vessel volume. An embodiment of the invention is one, any or all of prior embodiments in this paragraph up through the first embodiment in this paragraph wherein the nearly pure liquid carbon dioxide stream within the reboiler has a purity of greater than 90 mol %. An embodiment of the invention is one, any or all of prior embodiments in this paragraph up through the first embodiment in this paragraph wherein the nearly pure liquid carbon dioxide stream within the reboiler has a purity greater than 95 mol %. An embodiment of the invention is one, any or all of prior embodiments in this paragraph up through the first embodiment in this paragraph wherein the nearly pure liquid carbon dioxide stream within the reboiler has a purity of about 97 mol %. An embodiment of the invention is one, any or all of prior embodiments in this paragraph up through the first embodiment in this paragraph wherein a temperature of a bottoms stream entering the reboiler is between 10.4° C. and 10.8° C. An embodiment of the invention is one, any or all of prior embodiments in this paragraph up through the first embodiment in this paragraph wherein a bottoms stream inlet operating pressure is about 46.5 bar-g. The apparatus of claim 1 wherein a tube-side stream temperature within the carbon steel tubing bundle is between 20.9° C. and 32.5° C. An embodiment of the invention is one, any or all of prior embodiments in this paragraph up through the first embodiment in this paragraph wherein a tube-side stream temperature within the carbon steel tubing bundle is between 15.5° C. and 25.0° C. An embodiment of the invention is one, any or all of prior embodiments in this paragraph up through the first embodiment in this paragraph wherein an outside tube diameter in the carbon steel tubing bundle is less than 5.0 cm. An embodiment of the invention is one, any or all of prior embodiments in this paragraph up through the first embodiment in this paragraph wherein an outside tube diameter in the carbon steel tubing bundle is less than or equal to 2.5 cm.

A reboiler in fluid communication with a fractionator column in an offshore low temperature system removing carbon dioxide from natural gas, the reboiler comprising a rigid vessel having a carbon steel outer shell defining a vessel volume, the rigid vessel having an inlet in fluid communication with the fractionator for receiving a liquid stream therefrom and an outlet for returning a vapor to the fractionator; a carbon steel tubing bundle horizontally disposed within the vessel volume, each tube in the carbon steel bundle having an outer surface and an inner surface, the outer surface having a granular metal layer deposited thereon, and the inner surface having a plurality of fins extending radially inwardly relative thereto, wherein the granular metal layer comprises a pore size distribution adapted to promote and increase bubble nucleation during vaporization of liquid carbon dioxide on the outer surfaces of the tubes; a liquid carbon dioxide stream within the rigid vessel having a purity greater than 90 mol %, wherein the outer surface having the granular metal layer deposited thereon increases an overall heat transfer coefficient (U-value) of each tube in the carbon steel tubing bundle at least 1.3 times that of a bare outer surface of a tube in an otherwise identical carbon steel tubing bundle.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A reboiler in fluid communication with a fractionator column in an offshore low temperature system removing carbon dioxide from natural gas, the bottom reboiler comprising:
   a rigid vessel having an outer shell defining a vessel volume, the rigid vessel having an inlet in fluid communication with a fractionator for receiving a liquid stream therefrom and an outlet for returning a vapor to the fractionator; and a carbon steel tubing bundle disposed within the vessel volume each tube in the carbon steel tubing bundle having an outer surface and an inner surface, the outer surface having a granular metal layer deposited thereon, and the inner surface being generally smooth relative thereto, wherein the granular metal layer comprises a pore size distribution adapted to promote and increase bubble nucleation during vaporization of a nearly pure liquid carbon dioxide stream on the outer surfaces of the tubes and wherein the outer surface having the granular metal layer deposited thereon increases an overall heat transfer coefficient of each tube in the carbon steel tubing bundle by at least 1.3 times that of a bare outer surface of a tube in an otherwise identical carbon steel tubing bundle.

2. The reboiler of claim 1 wherein the granular metal layer is metallurgically bonded to each tube in the carbon steel tubing bundle.

3. The reboiler of claim 1 wherein the shell is produced from a carbon steel.

4. The reboiler of claim 1 wherein a weight of the reboiler is less than 27,000 kg.

5. The reboiler of claim 1 wherein a weight of the reboiler is less than 22,000 kg.

6. The reboiler of claim 1 wherein the inner surface has a plurality of fins extending radially inwardly relative thereto.

7. The reboiler of claim 1 wherein the reboiler is a bottom reboiler which receives a liquid bottoms stream from a fractionator column.

8. The reboiler of claim 1 wherein the carbon steel tubing bundle is horizontally disposed within the vessel volume.

9. The reboiler of claim 1 wherein the nearly pure liquid carbon dioxide stream within the reboiler has a purity of greater than 90 mol %.

10. The reboiler of claim 1 wherein the nearly pure liquid carbon dioxide stream within the reboiler has a purity greater than 95 mol %.

11. The reboiler of claim 1 wherein the nearly pure liquid carbon dioxide stream within the reboiler has a purity of about 97 mol %.

12. The reboiler of claim 1 wherein a temperature of a bottoms stream entering the reboiler is between 10.4° C. and 10.8° C.

13. The reboiler of claim 1 wherein a bottoms stream inlet operating pressure is about 46.5 bar-g.

14. The reboiler of claim 1 wherein a tube-side stream temperature within the carbon steel tubing bundle is between 20.9° C. and 32.5° C.

15. The reboiler of claim 1 wherein a tube-side stream temperature within the carbon steel tubing bundle is between 15.5° C. and 25.0° C.

16. The reboiler of claim 1 wherein an outside tube diameter in the carbon steel tubing bundle is less than 5.0 cm.

17. The reboiler of claim 1 wherein an outside tube diameter in the carbon steel tubing bundle is less than or equal to 2.5 cm.

18. A reboiler in fluid communication with a fractionator column in an offshore low temperature system removing carbon dioxide from natural gas, the reboiler comprising:

a rigid vessel having a carbon steel outer shell defining a vessel volume, the rigid vessel having an inlet in fluid communication with the fractionator for receiving a liquid stream therefrom and an outlet for returning a vapor to the fractionator;

a carbon steel tubing bundle horizontally disposed within the vessel volume, each tube in the carbon steel bundle having an outer surface and an inner surface, the outer surface having a granular metal layer deposited thereon, and the inner surface having a plurality of fins extending radially inwardly relative thereto, wherein the granular metal layer comprises a pore size distribution adapted to promote and increase a bubble nucleation during vaporization of liquid carbon dioxide on the outer surfaces of the tubes; and a liquid carbon dioxide stream within the rigid vessel having a purity greater than 90 mol %, wherein the outer surface having the granular metal layer deposited thereon increases an overall heat transfer coefficient (U-value) of each tube in the carbon steel tubing bundle at least 1.3 times that of a bare outer surface of a tube in an otherwise identical carbon steel tubing bundle.

* * * * *